May 4, 1965 W. H. AITKEN 3,181,902
SPROCKET RETAINING MEANS
Filed Jan. 23, 1962
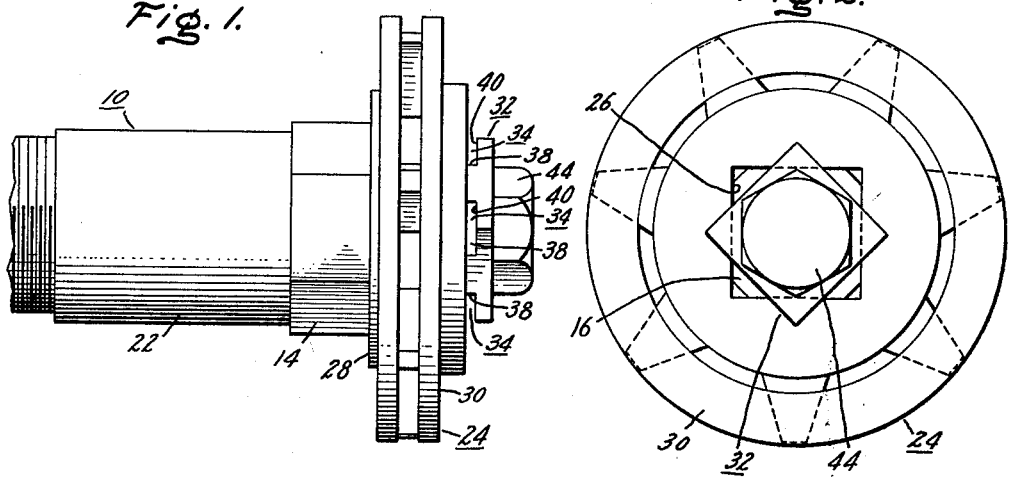
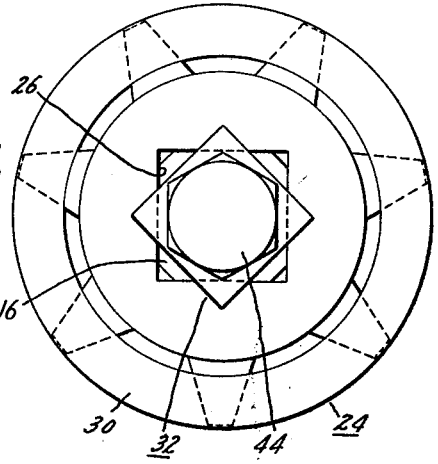
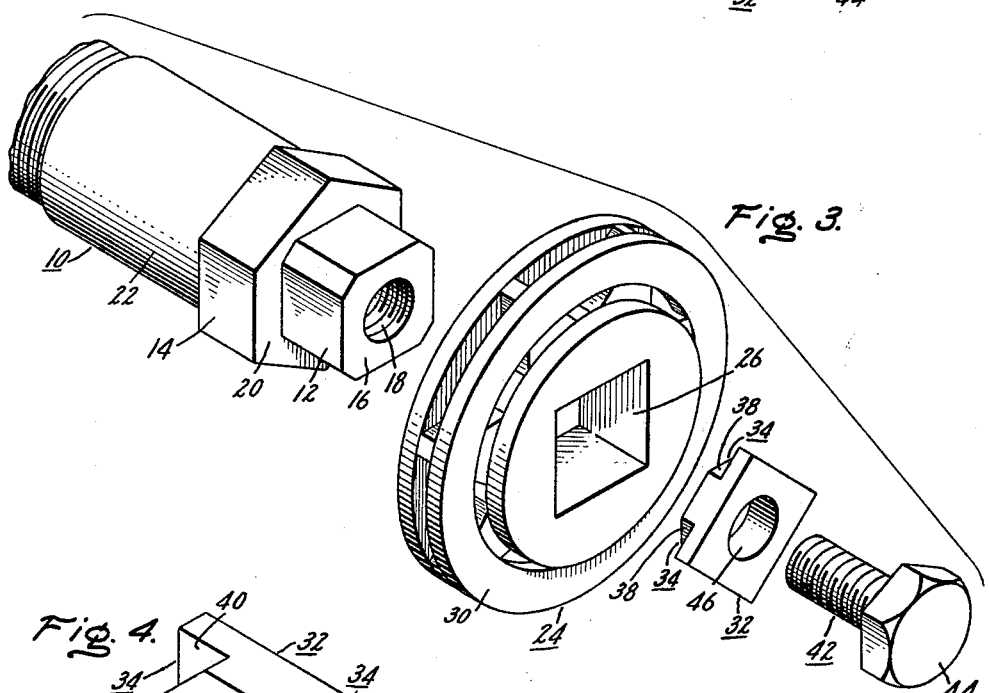
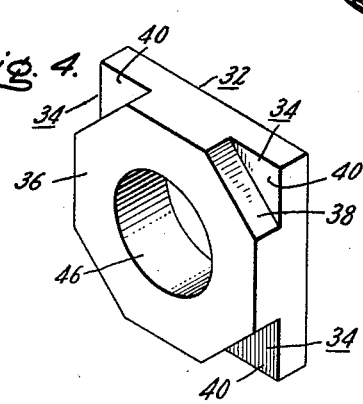
Inventor:
William H. Aitken,
John H. Lewis Jr.
John W. Phipps
Nicholas Skovran
His Attorneys.

3,181,902
SPROCKET RETAINING MEANS

William H. Aitken, Park Forest, Ill., assignor to Remington Arms Company, Inc., Bridgeport, Conn., a corporation of Delaware
Filed Jan. 23, 1962, Ser. No. 168,119
6 Claims. (Cl. 287—53)

This invention relates to an improved means by which a sprocket or other member can be non-rotatably mounted on the end of a shaft. More specifically, the invention is directed to a novel sprocket mounting means whereby a sprocket with a square hole is placed on a square shaft end portion. Then, a square retaining lug is adjustably clamped against the square shaft end portion, the lug being adapted when not tightly clamped, to be rotated a predetermined angle so that the corners of the lug retain the sprocket on the shaft upon final clamping.

It is an object of this invention to provide an easy, quick assembly for mounting a sprocket or gear on the end of a shaft.

It is another object of this invention to provide means whereby a sprocket can be easily mounted on or unmounted from the end of a shaft without removing bolts or other clamping means.

It is another object of this invention to provide means to secure a sprocket on the end of a shaft which prevents relative rotational movement but which permits a limited amount of axial movement of the sprocket on the shaft.

It is another object of this invention to provide a sprocket mounting means in which there is no clamping force exerted on the end face of the sprocket.

Another object of the invention is the provision of a sprocket retaining means which can be positioned so as to be held against rotation with respect to the sprocket while being tightened to retain the sprocket on the shaft.

Other objects and advantages will appear in the following specification, claims, and accompanying drawings in which:

FIGURE 1 shows a side view of the sprocket mounting assembly.

FIGURE 2 shows an end view of the device of FIGURE 1.

FIGURE 3 shows an exploded perspective view of the mounting assembly of FIGURE 1.

FIGURE 4 shows a perspective view of the retaining lug only.

The present invention was conceived as an answer to the problem of mounting a chain sprocket on the end of a rotating shaft of a chain saw. However, it appears obvious that the novel principles involved can also be applied to the mounting of gears, cams, hubs, wheels, or any other member which must be non-rotatably mounted on a shaft.

Referring to the drawings, it will be seen that shaft 10 has a square end shank portion 12 formed by facing off a predetermined length of a hexagonal metal bar 14. The shank 12 has an end face 16 in which a threaded hole 18 is drilled along the longitudinal axis of shaft 10. Shoulder 20 is formed at the inner end of shank portion 12. Shaft 10 also has a cylindrical portion 22 with which the present invention is not concerned.

Sprocket 24 has a central square opening 26 of approximately the same dimensions as the cross-sectional shape of the shank end portion 12. It can be seen that the shank end portion 12 is not a true square since the corners are beveled slightly. Thus, when the sprocket 24 is slipped over the square end shank portion 12, the sprocket cannot make any appreciable rotational movement relative to the shaft.

As mentioned above, the length of the square end shank portion is critical and depends on the width of the sprocket. Thus, when the sprocket is mounted on the shank portion 12 and moved inwardly thereon until the sprocket inner end face 28 abuts the shaft shoulder 20, the shank end face 16 will be positioned slightly inwardly of the sprocket outer end face 30.

Retaining lug 32 is the novel element in the combination which permits the assembly to achieve the necessary and desired results.

It can be seen from FIGURE 3 that the outer periphery of lug 32 is of the same square shape and approximate size as the sprocket opening 26 so that the lug can maintain a close fit and move through the opening.

Indentations or recesses 34 are provided in one of the retaining lug end faces 36 at each corner thereof. These recesses are cut at 45° angles to the sides of the lug and extend a predetermined depth down into the lug to form support faces 38 perpendicular to said lug end face and flats 40 perpendicular to said support face. (See FIGURE 4.) As can be seen in FIGURE 4, a raised octagonal portion is formed on the inner end of the lug and flats 40 perform as flange means.

After the sprocket is mounted on the shank end portion and slid in as far as it will go (until the sprocket abuts the shoulder 20), the recessed end of the lug is inserted in the sprocket opening 26 after the lug had first been rotated 45° from being aligned with the square sprocket opening. In this position, support faces 38 of the lug will be positioned in close proximity to the sides of the sprocket square opening and prevent any appreciable rotation of the lug relative to the sprocket. At the same time, the inner lug end face 36 bears against the shank end face 16 and the lug flats or flanges 40 are longitudinally spaced from the outer sprocket end face 30.

From the above, it can be seen that the depth of the recesses in the retaining lug in cooperation with the length of the square shank end portion and the width of the sprocket determine the amount of longitudinal play which the sprocket will have on the end of the shaft.

A clamping bolt 42, threaded at one end and having an enlarged head 44 at the other end is inserted through an opening 46 in the retaining lug, opening 26 in the sprocket and into threaded hole 18 in the shank end portion. Upon tightening, the bolt head 44 securely clamps the retaining lug inner end face 36 against the shank end face 16.

It will be appreciated that the total clamping force is exerted by the bolt through its enlarged head to the retaining lug to the shaft. There is no clamping force exerted on the sprocket end faces. In fact, the sprocket is permitted a limited axial or longitudinal movement, the limits being defined by the shoulder 20 on one end and the retaining lug flanges 40 on the other end.

An important aspect of the invention is that the sprocket can be easily mounted on or removed from the shaft without removing the retaining lug and bolt from the shaft. This must be considered an important feature especially in their use with chain saws where repairs are often made in the field and the chance of losing small parts is especially great.

To remove a sprocket from a shaft without removing or detaching the retaining lug and bolt, the bolt 42 is loosened sufficiently to permit the retaining lug to be retracted out of the sprocket aperture. The retaining lug is then rotated 45° until the corners of the lug are aligned with the corners of the sprocket aperture. At this point, the sprocket is withdrawn over the retaining lug and removed. Since the lug and bolt are not detached from the shaft, they are in no danger of being misplaced or lost. The sprocket mounting operation would be the reverse of the procedure outlined above.

While the specification and drawings refer to a square retaining lug, it must be appreciated that other angularly shaped retaining lugs can also be used. For example, an equilateral triangularly-shaped or pentagonal retaining lug could also be used.

What is claimed is:

1. In a locking means for mounting a member on a shaft, the combination comprising, a shaft end portion, an opening through said member in which said end portion moves axially to mount said member on said end portion, means limiting inward axial movement of said member on said end portion, means preventing relative rotational movement of said shaft and said member, retaining means clamped against said shaft end portion by a clamping means, said retaining means including flange portions spaced from said member when said member is in abutting relationship with said inward limiting means, thus permitting limited outward axial movement of said member on said shaft end portion.

2. A locking means for non-rotatably mounting a member on the end of a shaft comprising, an angularly shaped shank portion at one end of said shaft, an opening in said member of the same configuration as said shank which permits said member to move axially on said shank but which prevents rotational movement, stop means on said shaft to limit inward axial movement of said member on said shank at a point where the outer face of said member extends slightly outwardly of the end face of said shaft, retaining means adapted to be selectively non-rotatably positioned in said member opening and having cut-away portions thereon to permit a limited amount of outward axial movement of said member on said shaft when the retaining means is clamped in position, and means to clamp the inner end face of said retaining means against said shaft end face.

3. A device as recited in claim 2 in which said retaining means comprises a lug having substantially the same cross-sectional configuration as said member opening and which, when properly aligned with said opening, permits said member to move past said lug so that said member can be mounted on or unmounted from said shank without detaching said lug.

4. A locking means for mounting a sprocket on the end of a shaft comprising an outer shaft end portion, an aperture in said sprocket through which said shaft end portion is placed permitting axial sliding movement of said sprocket on said shaft end portion, stop means spaced a predetermined distance from the outer end face of said shaft limiting inward axial movement of said sprocket means preventing rotational movement of said sprocket relative to said shaft, retaining means positioned outwardly of said sprocket, said retaining means being partially inserted in said sprocket aperture and having an end portion bear against said shaft end face, said retaining means including flange means which limit outward axial movement of said sprocket on said shaft end portion, and means to clamp said retaining bearing portion against said shaft end face, said predetermined distance of said shaft end being slightly less than the width of said sprocket so that the outer sprocket face is positioned outwardly of said shaft outer end face, said flange means being so formed that when said retaining bearing portion is clamped tightly against said shaft end face, said flange means are spaced from said outer sprocket face thus permitting a limited amount of axial movement of said sprocket on said shaft.

5. In a locking means for mounting a member on the end of a shaft, the combination comprising: a shoulder on said shaft spaced from the outer end face thereof, an end portion of said shaft from said shoulder to said end face being angularly shaped, a threaded hole in said shaft end face, said member having a width greater than the length of said angularly shaped shaft end portion, an angularly shaped aperture in said member having the approximate cross-sectional shape and slightly larger than said angular shaft end portion to permit said member to slide on said end portion without any appreciable relative rotational movement, a retaining lug having the approximate cross-sectional shape and size as said angular shaft end portion and having an aperture therein, said lug having its angular corners cut away on the inner end face thereof so that when said lug is rotated a predetermined angle so that said lug is out of alignment with said member aperture said lug inner end face is non-rotatably positioned in said member aperture and bears against said shaft end face, threaded means inserted through said lug and member apertures and into said threaded shaft hole to clamp said lug inner end face against said shaft end face.

6. A locking means for non-rotatably mounting a member on the end of a shaft comprising, an angularly shaped shank portion at one end of said shaft, an opening in said member of the same configuration as said shank which permits said member to move axially on said shank but which prevents rotational movement, stop means on said shaft to limit inward axial movement of said member on said shank at a point where the outer face of said member extends slightly outwardly of the end face of said shank, retaining means non-rotatably positioned in said member opening and having means thereon to limit outward axial movement of said member, means to clamp the inner end face of said retaining means against said shank end face, said retaining means comprising a lug having substantially the same cross-sectional configuration as said member opening and which, when properly aligned with said opening, permits said member to move past said lug so that said member can be mounted on or unmounted from said shank without detaching said lug, said means which limit outward axial movement of said member on said shank comprising flange means formed by providing indentations in the inner end face of said lug across the corners of said lug, said indentations forming support faces perpendicular to the end faces of said lug and flat faces parallel to said lug end faces, said flat faces constituting said flange means, and said support faces adapted to bear against the walls of said member opening to prevent said lug from rotating relative to said member.

References Cited by the Examiner

UNITED STATES PATENTS

| 529,843 | 11/94 | Snyder | 287—53 X |
| 1,102,079 | 6/14 | Rizer | 287—53 X |
| 1,398,020 | 11/21 | Holley | 287—53 X |
| 1,781,721 | 11/30 | Earl | 287—53 |
| 2,275,315 | 3/42 | Ray | 85—50 |
| 2,803,032 | 8/57 | Barnsley. | |
| 2,904,358 | 9/59 | Rajan | 287—53 |
| 2,967,726 | 1/61 | Weston | 85—50 |
| 2,992,660 | 7/61 | Merz | 143—32 |

WILLIAM FELDMAN, *Primary Examiner.*

WALTER A. SCHEEL, *Examiner.*